United States Patent
Zhao et al.

(10) Patent No.: US 9,947,206 B2
(45) Date of Patent: Apr. 17, 2018

(54) ELECTRONIC DEVICE AND CONTROL METHOD THEREOF

(71) Applicant: Lenovo (Beijing) Co., Ltd., Haidian District, Beijing (CN)

(72) Inventors: Xiangpo Zhao, Beijing (CN); Kaicheng Shi, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/757,383

(22) Filed: Dec. 23, 2015

(65) Prior Publication Data

US 2017/0076561 A1    Mar. 16, 2017

(30) Foreign Application Priority Data

Sep. 16, 2015    (CN) .......................... 2015 1 0591938

(51) Int. Cl.
*G08B 5/22* (2006.01)
*G08B 21/18* (2006.01)
(Continued)

(52) U.S. Cl.
CPC ............ *G08B 21/182* (2013.01); *G01B 11/16* (2013.01); *G01V 8/20* (2013.01)

(58) Field of Classification Search
CPC ...... G08B 5/222; G08B 21/182; G01B 11/16; G01J 1/0219; G01J 1/08; G01J 1/44
See application file for complete search history.

(56) References Cited

U.S. PATENT DOCUMENTS

| 2014/0089010 A1 | 4/2014 | McKee et al. |
| 2014/0098040 A1* | 4/2014 | Kwon ....................... G06F 3/01 345/173 |

(Continued)

FOREIGN PATENT DOCUMENTS

| CN | 101739178 A | 6/2010 |
| CN | 103019469 A | 4/2013 |

(Continued)

OTHER PUBLICATIONS

Office Action, and English language translation thereof, in corresponding Chinese Application No. 201510591938.X, dated Aug. 14, 2017, 20 pages.

(Continued)

*Primary Examiner* — Quan-Zhen Wang
*Assistant Examiner* — Rajsheed Black-Childress
(74) *Attorney, Agent, or Firm* — Brinks Gilson & Lione; G. Peter Nichols

(57) ABSTRACT

An electronic device with a display screen is provided and the device includes an infrared light emitter for emitting infrared light; and an infrared light receiver configured corresponding to the infrared light emitter such that the infrared light receiver receives infrared light emitted by the infrared light emitter when the electronic device is not deformed or deformation of the electronic device is not greater than a preset threshold. A control unit is connected with the infrared light emitter and the infrared light receiver for transmitting first information to an operation system of the electronic device when the infrared light emitter emits infrared light but the infrared light receiver does not receive the infrared light. The electronic device enables detecting deformation of electronic devices using infrared light, so that damage to the screens of the electronic devices can be avoided as soon as possible.

12 Claims, 3 Drawing Sheets

(51) Int. Cl.
*G01B 11/16* (2006.01)
*G01V 8/20* (2006.01)

(56) References Cited

U.S. PATENT DOCUMENTS

| | | | |
|---|---|---|---|
| 2016/0252988 A1* | 9/2016 | Feng | G06F 3/042 |
| 2016/0275774 A1* | 9/2016 | Bostick | G06F 1/1652 |
| 2016/0357335 A1 | 12/2016 | Yao | |

FOREIGN PATENT DOCUMENTS

| | | |
|---|---|---|
| CN | 202995671 U | 6/2013 |
| CN | 104238833 A | 12/2014 |
| CN | 104407747 A | 3/2015 |
| CN | 104539800 A | 4/2015 |

OTHER PUBLICATIONS

Office Action, and English language translation thereof, in corresponding Chinese Application No. 201510591938.X, dated Feb. 2, 2018, 23 pages.

\* cited by examiner

ELECTRONIC DEVICE AND CONTROL METHOD THEREOF

This application claims priority to Chinese Patent Application No. 201510591938. X filed Sep. 16, 2015, the entire contents of which are incorporated herein by reference.

BACKGROUND

This disclosure relates to an electronic device, and more particularly to an electronic device capable of detecting if any deformation occurs on a device using infrared light.

Currently, display screen sizes of smart electronic devices such as cell phones or tablets keep increasing. However, display screens with larger sizes are more easily damaged. For example, the screen of an electronic device can be accidentally crushed when being carried or used by the user, and user experience will be greatly degraded if deformation or damages are introduced to the screen.

SUMMARY

In order to solve the above-described conventional technical problems, according to one aspect of the disclosure, an electronic device with a display screen for displaying contents is provided. The electronic device comprises: an infrared light emitter for emitting infrared light; and an infrared light receiver configured corresponding to the infrared light emitter such that the infrared light receiver can receive infrared light emitted by the infrared light emitter when the electronic device is not deformed or deformation of the electronic device is not greater than a preset threshold; and a control unit connected with the infrared light emitter and the infrared light receiver, for transmitting first information to an operation system of the electronic device when the infrared light transmitters emit infrared light but the infrared light receiver does not receive the infrared light.

Further, according to one embodiment of the disclosure, the infrared light emitter and the infrared light receiver are mutually correspondingly arranged in pairs, each pair comprises one infrared light emitter and one infrared light receiver configured at opposing ends of a line segment on the electronic device, wherein the infrared light emitter emits infrared light within a certain wavelength range to the infrared light receiver, and the infrared light receiver can receive the infrared light within a certain wavelength range emitted by the infrared light emitter when the electronic device is not deformed or deformation of the electronic device is not greater than a preset threshold.

Further, according to one embodiment of the disclosure, the infrared light emitter and the infrared light receiver mutually correspondingly arranged in pairs are respectively configured at two apexes of a diagonal line on the electronic device.

Further, according to one embodiment of the disclosure, after the control unit has transmitted the first information to the operation system of the electronic device, the operation system performs a first operation.

Further, according to one embodiment of the disclosure, the first operation comprises: sending out an alarm and/or perform a user interface operation.

Further, according to one embodiment of the disclosure, the infrared light emitter is an infrared laser emitter, and the infrared light receiver is an infrared laser receiver.

According to another aspect of the disclosure, a control method for an electronic device is provided. The electronic device comprises a display screen for displaying contents, an infrared light emitter for emitting infrared light, and an infrared light receiver configured corresponding to the infrared light emitter such that the infrared light receiver receive receive infrared light emitted by the infrared light emitter when the electronic device is not deformed or deformation of the electronic device is not greater than a preset threshold. The control method comprises: transmitting a first information to an operation system of the electronic device when the infrared light transmitters emit infrared light but the infrared light receiver does not receive the infrared light.

Further, according to one embodiment of the disclosure, the infrared light emitter and the infrared light receiver are mutually correspondingly arranged in pairs, each pair comprises one infrared light emitter and one infrared light receiver configured at opposing ends of a line segment on the electronic device, wherein the infrared light emitter emits infrared light within a certain wavelength range to the infrared light receiver, and the infrared light receiver receives the infrared light within a certain wavelength range emitted by the infrared light emitter when the electronic device is not deformed or deformation of the electronic device is not greater than a preset threshold.

Further, according to one embodiment of the disclosure, the infrared light emitter and the infrared light receiver mutually correspondingly arranged in pairs are respectively configured at two apexes of a diagonal line on the electronic device.

Further, according to one embodiment of the disclosure, the control method further comprises: after the control unit has transmitted the first information to the operation system of the electronic device, the operation system performs a first operation.

Further, according to one embodiment of the disclosure, the first operation comprises: sending out an alarm and/or perform a user interface operation.

Further, according to one embodiment of the disclosure, the infrared light emitter is an infrared laser emitter, and the infrared light receiver is an infrared laser receiver.

Thus it can be seen that, the electronic device and the control method thereof provided by the disclosure optimizes structures of conventional smart electronic devices, so as to enable detecting deformation of electronic devices using infrared light, and sending out alarms to users when deformation is detected, so that damages to the screens of the electronic devices can be avoided as soon as possible and user experience can be improved.

BRIEF DESCRIPTION OF THE DRAWINGS

In order to describe the technical solution of the embodiment of the disclosure more clearly, the accompanying drawings necessary for the description of the embodiments are explained simply. The accompanying drawings in the following description are only exemplary embodiment of the disclosure.

DETAILED DESCRIPTION

In order to make purposes, technical solutions and advantages more apparent, the preferred embodiments of the disclosure will be described in detail with reference to the accompanying drawing. Obviously, such embodiments are only exemplary, and do not encompass all possible embodiments of the present disclosure. It should be understood that the present disclosure is not limited by the exemplary embodiments described herein. Other embodiments that can be obtained by those skilled in the art without making further creative efforts should fall in the protection scope of the disclosure.

The preferred embodiments of the disclosure are described in detail with reference to the accompanying drawings as below.

Figure 1:
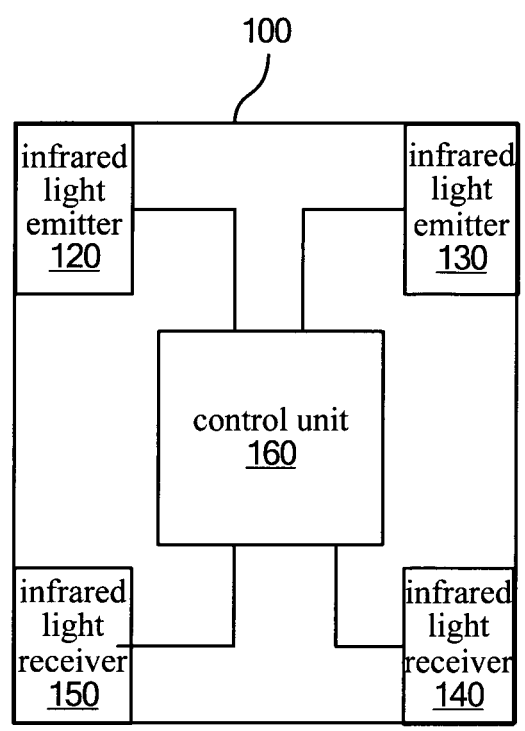
FIG. 1 illustrates a schematic structured block diagram of an electronic device 100 according to the embodiment of the disclosure.

FIG. 1 illustrates a schematic structured block diagram of an electronic device 100 according to the embodiment of the disclosure. Generally, the electronic device 100 includes a display screen for displaying contents. In an example of the disclosure, as shown in FIG. 1, the electronic device 100 further includes infrared light emitters 120, 130, infrared light receivers 140, 150 and a control unit 160.

Particularly, the infrared light emitters of the electronic device 100 can be used to emit infrared light. In one embodiment of the disclosure, the number of the infrared light emitters can be two. For example, as shown in FIG. 1, the infrared light emitter 120 can be configured to emit infrared light within a first wavelength range, and the infrared light emitter 130 can be configured to emit infrared light within a second wavelength range. The first wavelength range can be equal to or different from the second wavelength range, and the disclosure imposes no limitation thereon. In one example, when the infrared light emitter 120 and the infrared light emitter 130 have totally different emitting directions, the first wavelength range can be the same as the second wavelength range. In other embodiments of the disclosure, the electronic device 100 can have more than two infrared light emitters, and these emitters emit infrared light that belongs to different wavelength ranges. The more infrared emitters and corresponding receivers the electronic device 100 has got, the more accurate and sensitive the detection for deformation of the display screen of the electronic device is.

Generally, the infrared light, which belongs to invisible light, has a wavelength in the range of 780 nm-$10^6$ nm. 780 nm-1500 nm corresponds to near-infrared light, 1500 nm-30000 nm corresponds to intermediate-infrared light (majority of which is thermal radiation), and 30000 nm-$10^{-6}$ nm corresponds to far-infrared light. For example, the infrared light used in the present disclosure can be near-infrared light. Additionally, in one embodiment, the infrared light emitter can include an infrared laser emitter, which can be configured to emit infrared laser. In another embodiment of the disclosure, the infrared light emitter can comprise an infrared light emitting diode (LED) device, which can be configured to emit infrared light. Generally, the infrared light emitters 120, 130 of the electronic device 100 can be configured in the gap between housing of the electronic device 100 and the display screen of the electronic device 100. For example, in one embodiment, the infrared light emitters 120, 130 of the electronic device 100 can be configured on two neighboring sides of a rectangle formed by the four intersection lines of a base plate and the housing of the electronic device, wherein the electronic device 100 resides on the base plate. In another embodiment of the disclosure, the infrared light emitters 120, 130 of the electronic device 100 can be configured on two neighboring apexes of a rectangle formed by four intersection lines of the base plate and the housing of the electronic device. In other embodiments, when the electronic device 100 has more than two infrared light emitters, the infrared light emitters of the electronic device 100 can be configured on at least two neighboring sides or apexes of a rectangle formed by four intersection lines of the base plate and the housing of the electronic device. Those skilled in the art will appreciate that the infrared light emitters can also be configured at other locations to implement the deformation detection function.

Infrared light receivers of the electronic device 100 can be configured corresponding to the infrared light emitters such that the infrared light receivers can receive infrared light emitted by the infrared light emitters when the electronic device 100 is not deformed or deformation of the electronic device is not greater than a preset threshold. In one embodiment, the electronic device 100 can have two infrared light receivers, and these two infrared light receivers are configured corresponding to two infrared light emitters of the electronic device 100. For example, as shown in FIG. 1, the infrared light receiver 140 can be configured to receive infrared light within a first wavelength range emitted by the infrared light emitter 120, and the infrared light receiver 150 can be configured to receive infrared light within a second wavelength range emitted by the infrared light emitter 130. The first wavelength range can be equal to or different from the second wavelength range, the disclosure imposes no limitation thereon. In other embodiments of the disclosure, the electronic device 100 can have more than two infrared light emitters, and correspondingly, the electronic device 100 can have more than two infrared light receivers, and the infrared light receivers receive various infrared light corresponding to the various wavelength ranges emitted by the infrared light emitters. The more infrared emitters and corresponding receivers that the electronic device 100 has, the more accurate and sensitive the detection for deformation of the display screen of the electronic device is.

Generally, the infrared light receivers 140, 150 of the electronic device 100 can be configured in the gap between housing of the electronic device 100 and the display screen of the electronic device 100. In one embodiment, the infrared light emitters and the infrared light receivers are mutually correspondingly arranged in pairs, each pair comprises one infrared light emitter and one infrared light receiver configured at opposing ends of a line on the electronic device, wherein the infrared light emitter emits infrared light within a certain wavelength range to the infrared light receiver, and the infrared light receiver can receive the infrared light within a certain wavelength range emitted by the infrared light emitter when the electronic device is not deformed or deformation of the electronic device is not greater than a preset threshold. For example, in one embodiment, when the infrared light emitters 120, 130 of the electronic device 100 are configured on a first side and a second side, which are two neighboring sides of a rectangle formed by four intersection lines of a plane in which the electronic device resides and the housing of the electronic device, the infrared light receivers 140, 150 can be configured on a third side and a fourth side, which are the other two neighboring sides of the above rectangle. Moreover, the infrared light emitter 120 and the infrared light receiver 140, both of which emit or receive infrared light of the first wavelength range, are respectively configured on two non-neighboring sides of the rectangle. Similarly, the infrared light emitter 130 and the infrared light receiver 150, both of which emit or receive infrared light of the second wavelength range, are also respectively configured on two non-neighboring sides of the rectangle.

The infrared light emitters and the infrared light receivers mutually correspondingly arranged in pairs are respectively configured at two apexes of a diagonal line on the electronic device. For example, in one embodiment of the disclosure, the infrared light emitters 120, 130 of the electronic device 100 can be configured at a first apex and a second apex, which are two neighboring apexes of a rectangle formed by four intersection lines of a plane in which the electronic device 100 resides and the housing of the electronic device 100. At this time, the infrared light receivers 140, 150 can be configured at a third apex and a fourth apex, which are the other two neighboring apexes of the above rectangle formed by four intersection lines of a plane in which the electronic device 100 resides and the housing of the electronic device 100. Moreover, the infrared light emitter 120 and the infrared light receiver 140, both of which emit or receive infrared light of the first wavelength range, are respectively configured at two apexes of a first diagonal line of the rectangle. Similarly, the infrared light emitter 130 and the infrared light receiver 150, both of which emit or receive infrared light of the second wavelength range, are also respectively configured at two apexes of a second diagonal line of the rectangle. The infrared light emitter 120 can emit infrared light of the first wavelength range to the light receiver 140 for receiving infrared light of the first wavelength range, and the infrared light emitter 130 can emit infrared light of the second wavelength range to the light receiver 150 for receiving infrared light of the second wavelength range.

In other embodiments, when the electronic device 100 has more than two infrared light emitters, a same number of infrared light receivers can be configured. The infrared light emitters of the electronic device 100 can be configured on at least two neighboring sides or apexes of the rectangle formed by four intersection lines of a plane in which the electronic device 100 resides and the housing of the electronic device 100. Correspondingly, an infrared light emitter can be configured at a side that does not intersect with a side on which its corresponding infrared light receiver resides or at an apex that is not neighboring to an apex at which its corresponding infrared light emitter resides.

A control unit 160 connected with the infrared light emitters and the infrared light receivers of the electronic device 100 is used for transmitting first information to an operation system of the electronic device when the infrared light transmitters emits infrared light but the infrared light receivers does not receive the infrared light.

For example, in one embodiment of the disclosure, as shown in FIG. 1, when the electronic device 100 has two infrared light emitters 120, 130 and two infrared light receivers 140, 150, the control unit 160 can connect with the infrared light emitters 120, 130 and at the same time with the infrared light receivers 140, 150. The infrared light emitter 120 can emit infrared light of the first wavelength range to the light receiver 140 that receives the infrared light of the first wavelength range, and the infrared light emitter 130 can emit infrared light of the second wavelength range to the light receiver 150 that receives the infrared light of the second wavelength range.

Figure 3A:
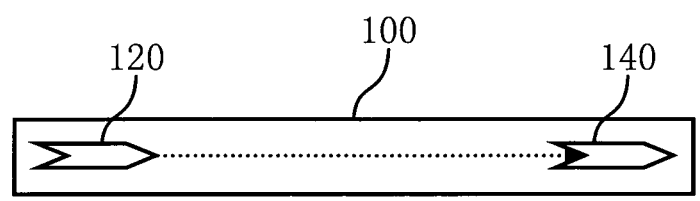
FIGS. 3A and 3B illustrate a schematic diagram of a process for detecting device deformation using infrared light emitter and receiver of the electronic device 100 according to the embodiment of the disclosure.
Figure 3B:
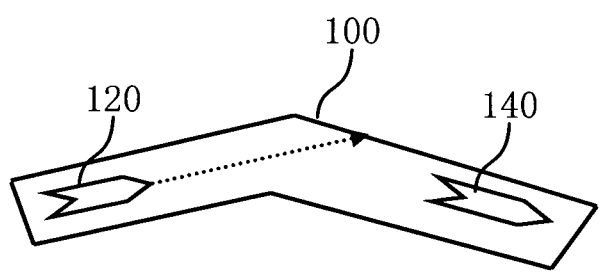

FIGS. 3A and 3B illustrate a schematic diagram of a process for detecting device deformation using infrared light emitters and receivers of the electronic device 100 according to one example of the disclosure. As shown in FIG. 3A, when the electronic device 100 is not deformed or deformation of the electronic device is not greater than a preset threshold, the infrared light receiver 140 can receive infrared light of the first wavelength range emitted by the infrared light emitter 120, and the infrared light receiver 150 can receive infrared light of the second wavelength range emitted by the infrared light emitter 130. As shown in FIG. 3B, when the infrared light receiver 140 for receiving infrared light of the first wavelength range does not receive infrared light of the first wavelength range emitted by the infrared light emitter 120, or the infrared light receiver 150 for receiving infrared light of the second wavelength range does receive infrared light of the second wavelength range emitted by the infrared light emitter 130, it is determined that the display screen of the electronic device 100 is deformed.

In one embodiment, when the infrared light receiver 140 does not receive infrared light of the first wavelength range emitted by the infrared light emitter 120, or the infrared light receiver 150 does receive infrared light of the second wavelength range emitted by the infrared light emitter 130, the control unit 160 of the electronic device 100 can immediately transmit information about infrared light being not detected to the operation system. Additionally, in other embodiments, when the electronic device 100 has more than two infrared light emitters and infrared light receivers, the control unit 160 can connect with the infrared light emitters and infrared light receivers of the electronic device 100. At this time, when it is detected that an infrared light receiver has not received infrared light of a certain wavelength range emitted by its corresponding infrared light emitter, the control unit 160 can transmit information about infrared light being not detected to the operation system.

When the operation system of the electronic device 100 receives the information about infrared light being not detected, it can perform certain operation to send out alarms in various ways, so that the user is alerted to take action in order to avoid damages to the display screen of the electronic device. For example, in one embodiment, the operation system of the electronic device 100 can perform certain operation to alert the user by making alarm sounds. In another embodiment, the user can be alarmed by display some alerts on the screen, which is due to user interface operation performed by the operation system of the electronic device 100.

It can be seen that, the electronic device 100 including infrared light emitters and receivers provided by the disclosure optimizes structures of conventional smart electronic devices, such that detecting deformation of electronic device 100 using infrared light is enabled, and when deformation is detected, the user can be alarmed by alarms, so that damages to the screen of the electronic device 100 can be avoided as soon as possible and user experience can be improved.

Figure 2:
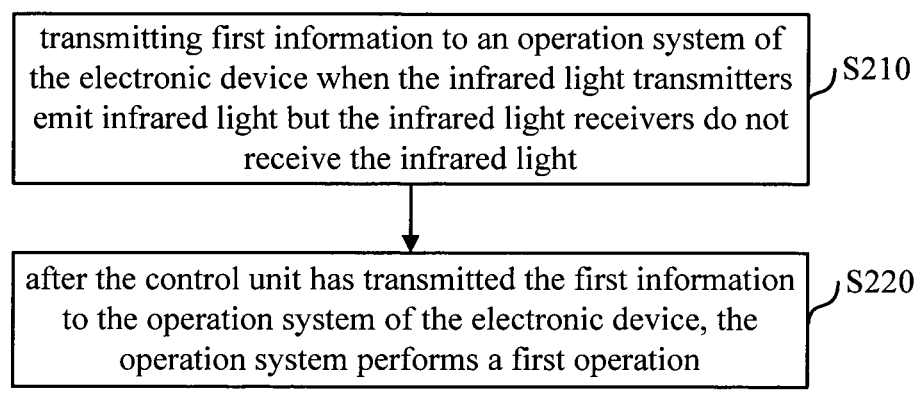
FIG. 2 illustrates a flow chart of a control method 200 applied to the electronic device 100 according to the embodiment of the disclosure.

According to another aspect of the disclosure, a control method 200 for the electronic device 100 is provided. FIG. 2 illustrates a flow chart of a control method 200 applied to the electronic device 100 according to one example of the disclosure. As shown in FIG. 1, the electronic device 100 includes a display screen for displaying contents. Also, the electronic device 100 can further include infrared light emitters 120, 130 and infrared light receivers 140, 150. The control method 200 can comprise: step S210, transmitting first information to an operation system of the electronic device when the infrared light transmitters emit infrared light but the infrared light receivers do not receive the infrared light. In one embodiment of the disclosure, as shown in FIG. 2, the control method 200 can further comprise: step S220, after the control unit has transmitted the first information to the operation system of the electronic device, the operation system performs a first operation.

Particularly, the infrared light emitters of the electronic device 100 can be used to emit infrared light. In one embodiment of the disclosure, the number of the infrared light emitters can be two. For example, as shown in FIG. 1, the infrared light emitter 120 can be configured to emit infrared light within a first wavelength range, and the infrared light emitter 130 can be configured to emit infrared light within a second wavelength range. The first wavelength range can be equal to or different from the second wavelength range. In other embodiments of the disclosure, the electronic device 100 can have more than two infrared light emitters, the disclosure imposes no limitation thereon. These emitters emit infrared light belong to different wavelength ranges. The more infrared emitters and corresponding receivers the electronic device 100 has got, the more accurate and sensitive the detection for deformation of the display screen of the electronic device is.

Generally, the infrared light, which belongs to invisible light, has a wavelength in the range of 780 nm-$10^6$ nm. 780 nm-1500 nm corresponds to near-infrared light, 1500 nm-30000 nm corresponds to intermediate-infrared light (majority of which is thermal radiation), and 30000 nm-$10^{-6}$ nm corresponds to far-infrared light. For example, the infrared light applied in the present disclosure can be near-infrared light. Additionally, in one embodiment, the infrared light emitter module 110 can comprise an infrared laser emitter, which can be configured to emit infrared laser. In another embodiment of the disclosure, the infrared light emitter module 110 can comprise a infrared light emitting diode (LED) device, which can be configured to emit infrared light. Generally, the infrared light emitters 120, 130 of the electronic device 100 can be configured in the gap between housing of the electronic device 100 and the display screen of the electronic device 100. In one embodiment, the infrared light emitters 120, 130 of the electronic device 100 can be configured on two neighboring sides of a rectangle formed by four intersection lines of a plane in which the electronic device 100 resides and the housing of the electronic device. In another embodiment of the disclosure, the infrared light emitters 120, 130 of the electronic device 100 can be configured on two neighboring apexes of a rectangle formed by four intersection lines of the plane in which the electronic device 100 resides and the housing of the electronic device. In other embodiments, when the electronic device 100 has more than two infrared light emitters, the infrared light emitters of the electronic device 100 can be configured on at least two neighboring sides or apexes of a rectangle formed by four intersection lines of the plane in which the electronic device 100 resides and the housing of the electronic device.

Infrared light receivers of the electronic device 100 can be configured corresponding to the infrared light emitters such that the infrared light receivers can receive infrared light emitted by the infrared light emitters when the electronic device 100 is not deformed or deformation of the electronic device is not greater than a preset threshold. In one embodiment, the infrared light emitters and the infrared light receivers are mutually correspondingly arranged in pairs, each pair comprises one infrared light emitter and one infrared light receiver configured at opposing ends of a line segment on the electronic device, wherein the infrared light emitter emits infrared light within a certain wavelength range to the infrared light receiver, and the infrared light receiver can receive the infrared light within a certain wavelength range emitted by the infrared light emitter when the electronic device is not deformed or deformation of the electronic device is not greater than a preset threshold. The electronic device 100 can have two infrared light receivers, and these two infrared light receivers are configured corresponding to two infrared light emitters of the electronic device 100. As shown in FIG. 1, the infrared light receiver 140 can be configured to receive infrared light within a first wavelength range emitted by the infrared light emitter 120, and the infrared light receiver 150 can be configured to receive infrared light within a second wavelength range emitted by the infrared light emitter 130. The first wavelength range can be equal to or different from the second wavelength range. For example, when the infrared light emitter 120 and the infrared light emitter 130 have totally different emitting directions, the first wavelength range can be the same as the second wavelength range. Generally, the infrared light receivers 140, 150 of the electronic device 100 can be configured in the gap between housing of the electronic device 100 and the display screen of the electronic device 100. In one embodiment, the infrared light emitters and the infrared light receivers mutually correspondingly arranged in pairs are respectively configured at two apexes of a diagonal line on the electronic device. For example, the infrared light emitters 120, 130 of the electronic device 100 can be configured at two neighboring apexes of a rectangle formed by four intersection lines of a plane in which the electronic device 100 resides and the housing of the electronic device 100. At this time, the infrared light receivers 140, 150 can be configured at the other two neighboring apexes of the above rectangle. Moreover, the infrared light emitter 120 and the infrared light receiver 140, both of which emit or receive infrared light of the first wavelength range, are respectively configured at two apexes of a first diagonal line of the rectangle. Similarly, the infrared light emitter 130 and the infrared light receiver 150, both of which emit or receive infrared light of the second wavelength range, are also respectively configured at two apexes of a second diagonal line of the rectangle. The infrared light emitter 120 can emit infrared light of the first wavelength range to the light receiver 140 for receiving infrared light of the first wavelength range, and the infrared light emitter 130 can emit infrared light of the second wavelength range to the light receiver 150 for receiving infrared light of the second wavelength range.

FIGS. 3A and 3B illustrate a schematic diagram of a process for detecting device deformation using infrared light emitters and receivers of the electronic device 100 according to one example of the disclosure. As shown in FIG. 3A, when the electronic device 100 is not deformed or deformation of the electronic device is not greater than a preset threshold, the infrared light receiver 140 can receive infrared light of the first wavelength range emitted by the infrared light emitter 120, and the infrared light receiver 150 can receive infrared light of the second wavelength range emitted by the infrared light emitter 130. As shown in FIG. 3B, when the infrared light receiver 140 does not receive infrared light of the first wavelength range emitted by the infrared light emitter 120, or the infrared light receiver 150 does receive infrared light of the second wavelength range emitted by the infrared light emitter 130, it is determined that the display screen of the electronic device 100 is deformed. In one embodiment, when the infrared light receiver 140 does not receive infrared light of the first wavelength range emitted by the infrared light emitter 120, or the infrared light receiver 150 does receive infrared light of the second wavelength range emitted by the infrared light emitter 130, the control unit 160 of the electronic device 100 can immediately transmit to the operation system information that at least one infrared light receiver has not received infrared light. When the operation system of the electronic device 100 receives the information that at least one infrared light receiver has not received infrared light, it can perform certain operation to send out alarms in various ways, so that the user is alerted to take action in order to avoid damages to the display screen of the electronic device. For example, in one embodiment, the operation system of the electronic device 100 can perform certain operation to alert the user by making alarm sounds. In another embodiment, the user can be alarmed by display alerts on the screen, which is due to user interface operation performed by the operation system of the electronic device 100.

It can be seen that, the control method 200 for the electronic device having infrared light emitters and receivers provided by the disclosure, can detect the deformation of electronic device using infrared light, and when the deformation is detected, the user can be alarmed by alarms in time, so that damages to the screen of the electronic device can be avoided as soon as possible and user experience can be improved.

It is noted that, in the description above, terms "comprise", "include" or other variants thereof are intended to encompass non-exclusive including, such that a process, method, product or device comprising a series of elements not only comprises such elements, but also other elements that are not explicitly listed, or intrinsic elements for such process, method, product or device. Without further limitation, elements limited by "comprise one . . . " does not exclude the situation that other identical elements can exist in the process, method, product, or device that comprises the element.

Finally, it is noted that, the above series of processes comprise not only processes that are executed in a time sequence according to the sequence described above, but also those executed in parallel or separately rather than in a time sequence.

From above, those skilled in the art can clearly realize that the present disclosure can be implemented via a combination of software and a necessary hardware platform, or only via hardware. Based thereon, contributions of the present disclosure on the prior art can be embodied in a form of software product. The computer software product can be stored in a storage media, such as ROM/RAM, magnetic disks, optical discs, and so on, and comprises instructions for enabling a computer device (which can be a personal computer, a server, or a network device, etc.) to implement methods illustrated in various embodiments of the disclosure or some part thereof.

The above description elaborates the principle of the disclosure and its embodiments via examples. Such description is only for the purpose of providing help for understanding the method of the disclosure and its essential ideas. Meanwhile, those skilled in the art can understand that the disclosure can be made various modifications, combinations, partial combinations and alternation depending on the design needs and other factors, so long as they are in the scope of the attached claims and their equivalents. The description does not limit the disclosure.

The invention claimed is:

1. An electronic device with a display screen for displaying, comprising:
   an infrared light emitter for emitting infrared light;
   an infrared light receiver configured to be arranged corresponding to the infrared light emitter such that the infrared light receiver receives infrared light emitted by the infrared light emitter when the electronic device is not deformed or deformation of the electronic device is not greater than a preset threshold; and
   a control unit connected with the infrared light emitter and the infrared light receiver, for transmitting first information to an operation system of the electronic device when the infrared light emitter emits infrared light but the infrared light receiver does not receive the infrared light, wherein the infrared light travels inside the electronic device.

2. The electronic device according to claim 1, wherein the infrared light emitter and the infrared light receiver are mutually correspondingly arranged in pairs, each pair comprises one infrared light emitter and one infrared light receiver configured at opposing ends of a line segment on the electronic device, the infrared light emitter emits infrared light within a certain wavelength range to the infrared light receiver, and the infrared light receiver receives the infrared light within a certain wavelength range emitted by the infrared light emitter when the electronic device is not deformed or deformation of the electronic device is not greater than a preset threshold.

3. The electronic device according to claim 2, wherein the infrared light emitter and the infrared light receiver mutually correspondingly arranged in pairs are respectively configured at two apexes of a diagonal line on the electronic device.

4. The electronic device according to claim 3, wherein after the control unit has transmitted the first information to the operation system of the electronic device, the operation system performs a first operation.

5. The electronic device according to claim 4, wherein the first operation comprises sending out an alarm and/or performing a user interface operation.

6. The electronic device according to claim 5, wherein the infrared light emitter is an infrared laser emitter, and the infrared light receiver is an infrared laser receiver.

7. A control method for an electronic device, wherein the electronic device comprises a display screen for displaying, an infrared light emitter for emitting infrared light, and an infrared light receiver configured to be arranged corresponding to the infrared light emitter such that the infrared light receiver receives infrared light emitted by the infrared light emitter and travels inside the electronic device when the electronic device is not deformed or deformation of the electronic device is not greater than a preset threshold, the control method comprises:
   transmitting first information to an operation system of the electronic device when the infrared light emitter emits infrared light but the infrared light receiver does not receive the infrared light, wherein the infrared light travels inside the electronic device.

8. The control method according to claim 7, wherein the infrared light emitter and the infrared light receiver are mutually correspondingly arranged in pairs, each pair comprises one infrared light emitter and one infrared light receiver configured at opposing ends of a line segment on the electronic device, the infrared light emitter emits infrared light within a certain wavelength range to the infrared light receiver, and the infrared light receiver receives the infrared light within a certain wavelength range emitted by the infrared light emitter when the electronic device is not deformed or deformation of the electronic device is not greater than a preset threshold.

9. The control method according to claim 8, wherein the infrared light emitter and the infrared light receiver mutually correspondingly arranged in pairs are respectively configured at two apexes of a diagonal line on the electronic device.

10. The control method according to claim 9, further comprises after the control unit has transmitted the first information to the operation system of the electronic device; the operation system performs a first operation.

11. The control method according to claim 10, wherein the first operation comprises sending out an alarm and/or performing a user interface operation.

12. The control method according to claim 11, wherein the infrared light emitter is an infrared laser emitter, and the infrared light receiver is an infrared laser receiver.

* * * * *